Sept. 29, 1964    F. E. ELGE    3,150,437
APPARATUS FOR MAKING TUBING
Filed Sept. 21, 1960    3 Sheets-Sheet 3
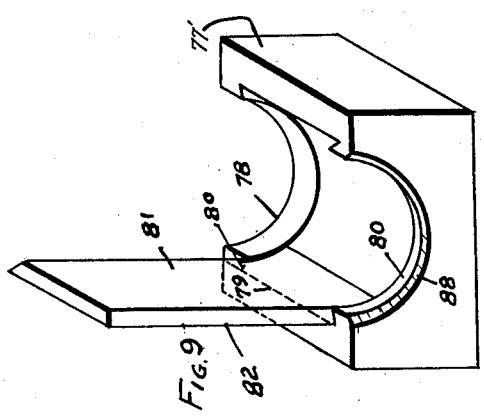
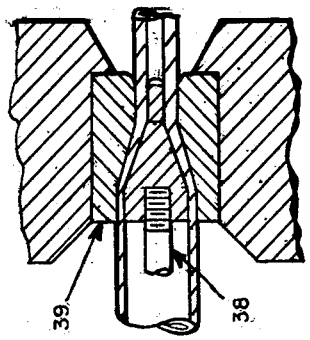
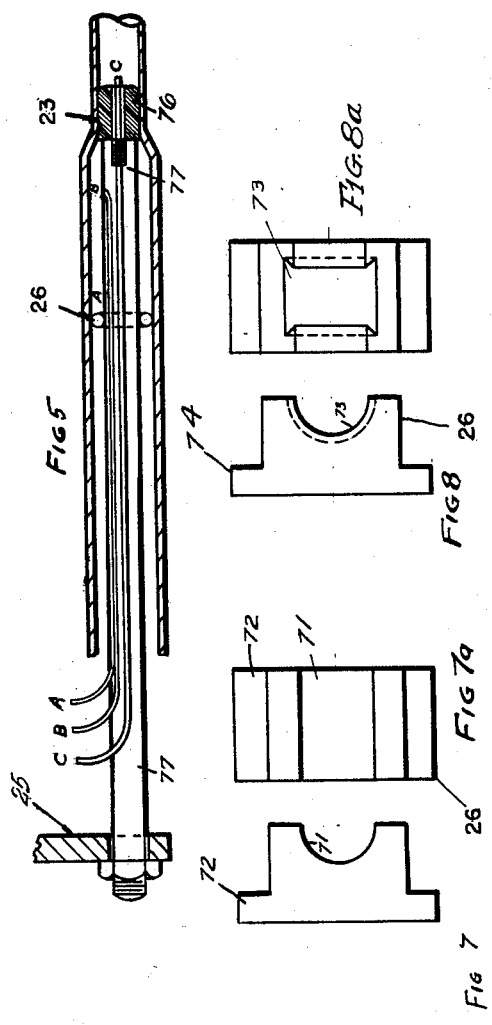
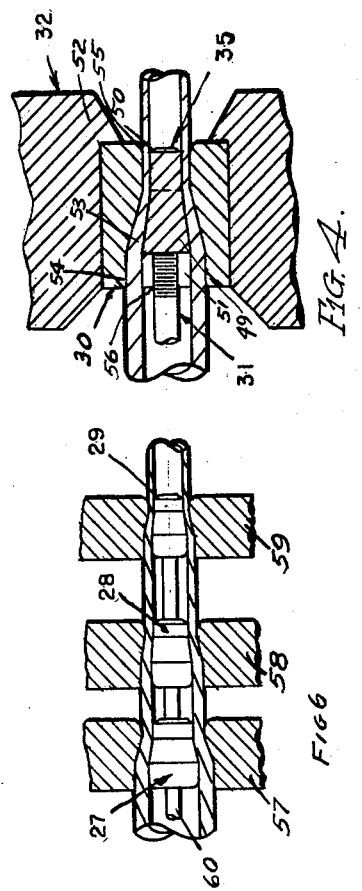
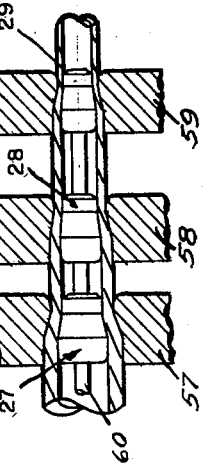
INVENTOR
FRANK E. ELGE 3,150,437
APPARATUS FOR MAKING TUBING
Frank E. Elge, Ludlow, Pa., assignor to McKean Tube
Company, Kane, Pa., a corporation of Pennsylvania
Filed Sept. 21, 1960, Ser. No. 57,571
3 Claims. (Cl. 29—33)

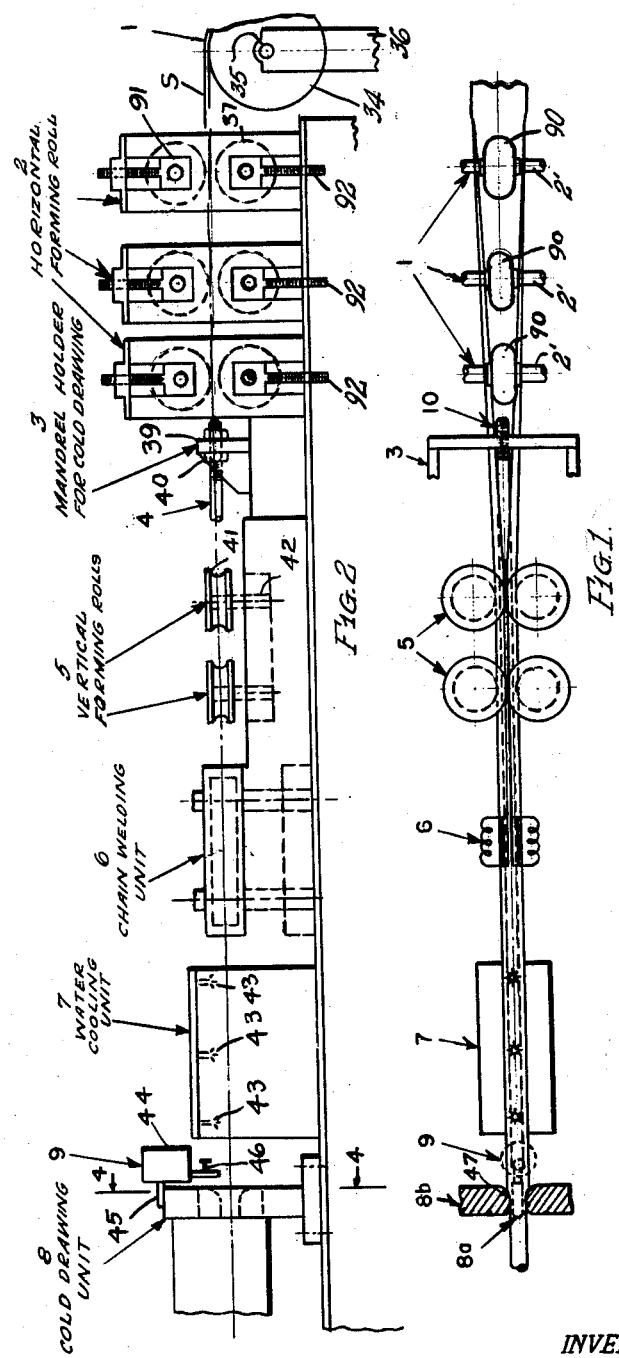

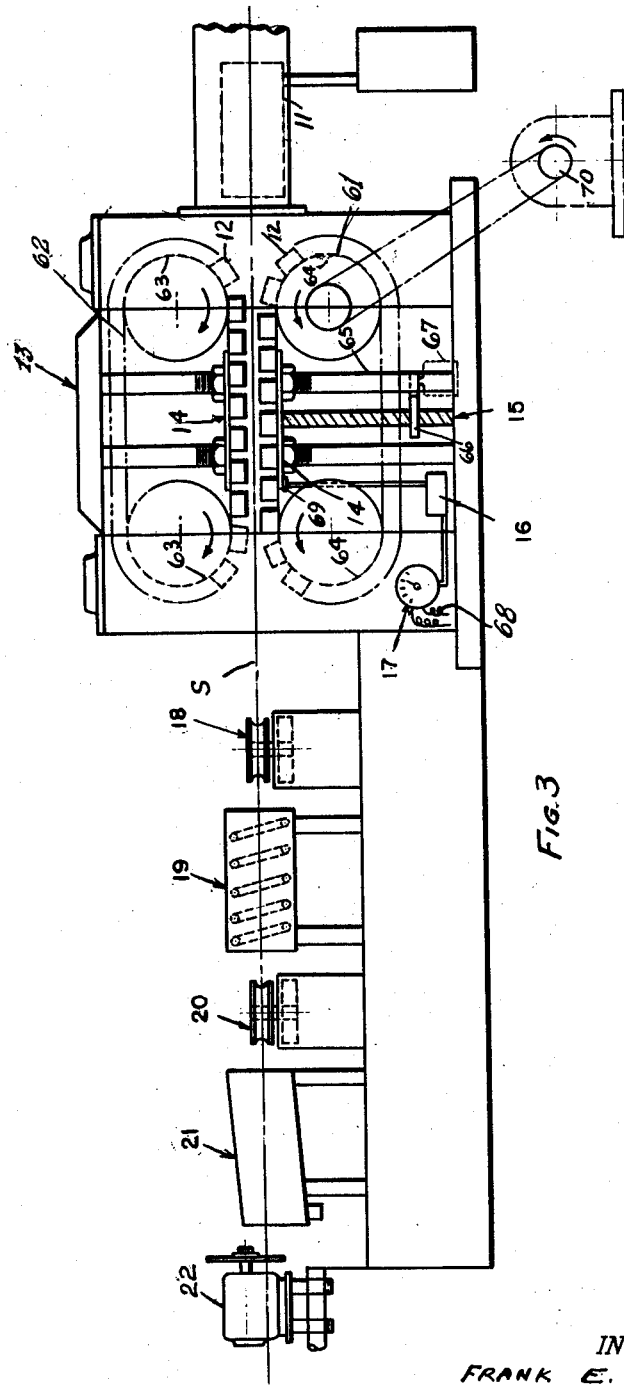

This invention relates to an apparatus for producing tubular articles from continuous strip stock which is continuously formed into a longitudinal tubular form or other shape, welded, and continued through a device which materially changes the outside diameter and the cross sectional area of the wall of the longitudinal article as the strip flows continuously to the machine.

In the machine disclosed herein, means is provided for controlling the speed of the article through the machine since the speed materially increases after the wall reduction. Means is provided for preventing the strip from buckling at the point where it is formed. Also, means is provided for removing the drawing compound from the article before it reaches its destination to prevent the chain pulling device from slipping on the article.

In order to accomplish the wall reduction, a plug is located inside the formed tube. The plug is attached to a support outside the formed tube by means of a rod.

The improved pull unit is made up of two special driven chains having improved cleats or clamps fastened thereon. The clamps are shaped to the outside of the tube and means is provided to insure a uniform pressure on the longitudinal articles passing between the chains. The pull unit is designed to exert not less than thirty percent more power for clamping than is used for the pulling force. Such clamps can exert eight hundred pounds pressure for every square inch area and are so placed that the longitudinal article is completely surrounded by these clamps, both circumferentially and throughout a given length.

This invention further relates to an improved straightening device in combination with the aforementioned equipment which is applied before the longitudinal article enters the pulling unit. This combination of forming, welding, and cross sectional reducing of tubing or similar shaped articles is, in effect, a continuous draw bench having a minimum length of not less than two feet and not more than twenty feet. The machine has power to reduce the outside diameter of such longitudinal articles to at least three-sixteenths inch diameter and up to fifty percent of its cross sectional area. It will operate on lengths as great as the strips fed into the mill. It is necessary that the draw bench be not less than the minimum of two feet and not longer than twenty feet.

An annealing furnace is also located in the machine after the pull unit. The longitudinal article or tube is annealed in this unit and then passed through a suitable quenching media and from thence to a conventional type of flying cut-off saw.

More specifically, it is an object of the present invention ot provide a machine wherein a steel bar having a plug on the end thereof is fastened to the machine frame in alignment with the inside of the tube. The plug is either hollow or has one or more tubes extending therethrough through which the drawing compound is fed to the inside of the tube at the plug. The plug also has a hole or opening therein for passing an inert gas therethrough to protect the inside of the tube against scaling and corrosion at the point of annealing. The plug also has an arrangement for preventing any excess drawing compound from leaking into the tube being formed.

Another object of this invention is to provide a machine for heavy cross sectional reducing of metal strips where the material can be coated with a suitable compound on the outside and, by drying it to the strip, it will greatly reduce the frictional force of the dies on the material as it passes through a cold reducing section.

It is another object of the invention to provide an improved pull unit having clamps thereon which are made of a suitable material such as aluminum, non-ferrous alloys, plastic, or rubber materials which prevents them from marking the outside of the longitudinal article passing through it.

Still another object of the invention is to provide a continuous process of forming, welding, and heavy cross section reducing of a longitudinal article with one or more pull units placed in line for further cross sectional reduction.

Yet another object of the invention is to provide an improved draw die for a tube forming machine.

Still yet another object of this invention is to provide an improved straightening unit in combination with a forming, welding, and annealing machine.

A further object of the invention is to provide an improved machine having one or more sets of rolls and having a series of hardened plugs made of material such as tungsten carbide in combination with an improved die for cross sectional reduction.

A still further object of the invention is to provide an improved machine for forming tubing wherein a floating plug has means thereon to apply drawing compound inside the tubing.

It is yet a further object of the invention to provide an improved drawing machine wherein an electromagnetic induction furnace heats the tube prior to its entering the heavy cross sectional reduction die which heats the tube and does not heat the plug.

Still yet a further object of the invention is to provide an improved pull unit which automatically increases and decreases the gripping pressure of its pressure elements on the tube and controls the force of the tube.

Still another object of the invention is to provide an improved control for controlling the speed of a tube through a forming machine.

It is yet another object of this invention to provide a machine for forming tubing which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings—
FIG. 1 is a top view of the first half of a machine according to the invention;
FIG. 2 is a side view of the machine shown in FIG. 1;

FIG. 3 is a side view of the second half of the machine which forms a continuation of the half shown in FIG. 2;

FIG. 4 is a cross sectional view of the draw die taken on line 4—4 of FIG. 2;

FIG. 5 is a view similar to FIG. 4 showing the improved plug;

FIG. 6 is a cross section view of still another embodiment of the plug;

FIG. 7 is a side view of one embodiment of the gripping means for the draw unit;

FIG. 7a is a top view of the gripping means shown in FIG. 7;

FIG. 8 is a view of another embodiment of the gripping means;

FIG. 8a is a top view of the gripping means shown in FIG. 8;

FIG. 9 is an enlarged isometric view of another embodiment of a tube engaging member; and FIG. 10 is a cross sectional view similar to FIG. 4 of another size of the draw die.

Now with more particular reference to the drawings, especially FIGS. 1, 2, and 3, the machine disclosed herein has a coiler 1 for supporting a coil of strip material, for example, of stainless steel. The strip is fed through horizontal forming rolls 2 where it is formed in a generally channel shape and passes around a bar 4 which is attached to a mandrel holder 3 in turn fixed to the machine frame. The strip then passes through vertical forming rolls 5 where the channel is closed to form a tube. The forming rolls are made up of rollers 90 freely slidable and rotatable on shafts 2'. The shafts 2' are carried on journals 91 which are adjustable inwardly by jack screws 92.

The tube so formed then passes through a welding unit 6, through a water cooling unit 7 which cools it after the weld and, from thence, to a cold drawing unit 8. The unit 8 includes an arrangement of dies or rolls for reducing the outside diameter of the tubing and the wall cross sectional area of the tube. The draw unit 8 includes and inside plug 48 at this point, more particularly shown in FIGS. 4, 5, and 6 and hereinafter more fully described.

Drawing compound is poured onto the outside of the tube by a dispensing unit 9 and the formed tube passes through a washing chamber 11 shown partly in FIG. 1 and partly in FIG. 2. From the washing chamber 11, the formed tube passes through an improved pull unit 13 having a pressure plate 14 and power applying means through screws 15 with a sensing device 16 for controlling the gripping pressure. The sensing device 16 includes a contact member 17 which controls the force on the pressure plate 14 to a predetermined pressure. The contact member 17 may be in the form of an electrical contact or it could be a hydraulic sensing unit for opening or closing the pressure plate 14 at the desired pressure. After leaving the pull unit, the tube passes through guide rolls 18, through an annealing furnace 19, through guide rolls 20 and a water cooling unit 21 to a flying cut-off saw 22.

In FIG. 5, the tubing is indicated at 23 after being reduced in size. Tubes 25 carry drawing fluid to the inside of the tube and other corresponding tubes are provided for removing excess compound. Tubing C in FIG. 5 may carry inert gas to the inside of the tube formed.

In the embodiment of the invention shown in FIG. 6, inside floating plugs 27, 28, and 29 are all supported on a single rod 60 for reducing the cross sectional area at three external female plugs.

In FIG. 4, an outside die 30 is shown with holders 32 for cold reducing and a plug 33 passing through a rod holder 31, causing reduction of the wall as well as the outside diameter of the tube.

A strip S is coiled on the coiler 1 having a drum 34 supported on an axle 35' which is in turn supported by means of a bracket 36 on the fixed base. The drum 34 is made of a suitable width for supporting the strip S.

The forming rolls 2 are provided with a peripheral groove thereon and rolls 37 are generally supported on axles and are vertically adjustable by means of the screws 92 in the manner of corresponding rolls 11 shown in Patent No. 2,822,291.

The bar or rod 4 is supported on a bracket 39 which is in turn attached to the fixed machine base. The bar 4 has a double nut 40 for attaching it in a conventional manner. The bar 4 extends past the vertical forming rolls 5 which close the tube around the bar 4 by means of their outer peripheral grooves 41. The rolls 5 are attached to the machine frame by suitable axes 42. From the forming rolls, the tube passes through the welding unit 6 which is also of a type generally known to those skilled in the art and could take the form of the welding unit shown in Patent No. 2,563,214. The said patent is also exemplary of the type of forming rolls used herein.

From thence, the formed and welded tube passes through the water cooling unit 7. The water cooling unit 7 can be in the form of the water cooling unit shown in Patent No. 2,822,291. The unit 7 has water jets 43 for impinging water on the tube and a suitable funnel arrangement for carrying the water away from the machine.

The dispensing unit 9 for drawing compound is generally made up of a tank 44 which can hold a suitable quantity of liquid drawing compound and may be supported on the machine by means of a bracket 45. A valve 46 is provided for regulating the amount of drawing liquid dispensed onto the formed tube.

The draw die and reducing rolls are shown in several embodiments. The embodiment of the draw arrangement shown in FIG. 1 shows a plug 8a which is attached to the end of the bar 4. The plug 8a may be generally in the form of the plug 33 shown in FIG. 4 and it runs concentric to the center of the tube. Wheels 8b can be of any suitable shape or the reference numeral 8b could refer to a suitable hollow die having curved surfaces such as indicated at 47 on the inlet side.

The pull unit shown particularly in FIG. 3 is made up of two chains 61 and 62 each supported on suitable axles on the machine frame and supported on rollers 63 and 64 as shown. These chains are supported by columns 65 and adjusted by means of nuts 66. These columns in which each of those shown may illustrate two spaced columns attached to a laterally extending beam which engages the chains are fixed at their outer ends to the machine frame.

In FIG. 4, the plug 48 is shown attached to the rod holder 31. The plug 48 has a frusto-conical portion 49 attached to a cylindrical portion 50 integrally and rigidly attached thereto and having an enlarged cylindrical portion 51 likewise integrally attached thereto.

The die holder 32 has a counterbore 52 which receives the die 30. The die 30 has a frusto-conical female portion 53 communicating with a cylindrical bore 54 and likewise with a reduced size cylindrical bore 55. A threaded hole 56 in the enlarged cylindrical portion of the plug receives the threaded end of the member 31. The reduced size cylindrical bore 55 is concentric to the cylindrical portion 50. The frusto-conical portion of the portion 53 is concentric to the frusto-conical portion 49 of the plug and the cylindrical bore 54 is concentric to the enlarged cylindrical portion 51 so that as the tube is drawing over the die, the plug sizes the inside of the tube and the die sizes the outside.

In the embodiment of the invention shown in FIG. 6, three separate dies 57, 58, and 59, each being somewhat similar to the die 30, are disposed over the plugs 27, 28, and 29, respectively. These plugs are similar to the plug 48 and are all attached to the rod 60 which is similar to the rod 4 shown in FIGS. 1 and 2. It will be seen that these dies will progressively reduce the size of the tube.

By a suitable arrangement of annealing means such as induction heating or even radiating heating means between the dies 57 and 58 and the dies 58 and 59, the work hardening of the tube resulting from the draw through the progressive dies in FIG. 6 can be reduced.

The pressure plates 14 rest on the lower part of the chain and these pressure plates are urged upwardly by the power driven jack screws 15 which have a nut 66 driven by an electric motor 67. The electric motor 67 is in turn driven by an electrical circuit connected to a wire 68 which is actuated by the sensing device 16. The sensing device 16 controls the gripping pressure by driving the motor 67 when the pressure on a sensing member 69 increases or decreases. The lower chain is driven by a motor 70.

In the embodiment of the invention shown in FIG. 5, a plug 76 is attached to a rod 77 which is in turn attached to the tube 25. Tubes A, B, and C connect to the outside of the rod inside the enlarged portion of the tube to carry away excess fluid and the rod or tube C extends through the center of the plug 76 to provide an inert atmosphere to prevent corrosion.

FIGS. 7 and 8 show views of one of the shoes attached to the chains 61 and 62 in FIG. 3. The shoe shown in FIG. 7 has a concave lower portion 71 which is substantially the same radius as the outside diameter of the tube which it is to engage. A flange 72 is attached to the chains by suitable bolts, rivets, or the like.

FIG. 8 shows another embodiment of the shoes for use with the chains of FIG. 3. The embodiment shown in FIG. 8 discloses a liner 73 which may be of aluminum or other suitable non-ferrous metal or other soft material which will not mar the outside of the tube. The shoes are attached to the chains by means of flanges 74 which may be attached with rivets, bolts, or by welding or other suitable fastening means. The liner 73 is inset and attached by suitable means.

FIG. 9 shows another embodiment of the shoes for use in the chain of FIG. 3. The shoe 12 has a generally cubical body 77' with a groove defining a concave surface 78 therein. The edges of the groove are chamfered at 88 so that the edges thereof will not dig into the tubing as each shoe 12 moves up to engage the tube. A circumferential groove 79 defining a generally hemi-cylindrical surface is formed in the shoe 12 with inwardly directed walls. Each groove 79 receives a strip of material 81 which has tapering sides 82 complementary to the inside surfaces of walls 80. The strips 81 may be made of a flexible material having a relatively high coefficient of friction on stainless steel such as rubber, copper, aluminum, or the like. The strips 81 may be of slightly greater depth than the depth of the groove 79 so that they will project above the surface 88 of the groove. Thus, the strips engage the tube and protect it from damage.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A machine for forming, welding, and heavy reduction of cross section of pipe from sheets of material comprising
   means to support a strip of material to be formed,
   means for forming said strip into the shape of a tube,
   means to weld the edges of said strip together,
   sizing means to reduce the size of said tube,
   pull unit means to pull said tube through said forming means,
   said pull means comprising continuous chains on opposite sides of said tube,
   each said chain having spaced clamps thereon,
   each said clamp having a groove in its outer surface,
   the surface of said groove being in the form of a part of a cylinder and adapted to receive and frictionally engage the outside surface of said tube,
   a pressure plate disposed in engagement with one said chain on the opposite side thereof from said tube.
   means to regulate the pressure of said pressure plate between fixed limits,
   said means to regulate said pressure comprising a lead screw,
   a motor actuating said lead screw,
   and a sensing means for determining the force exerted on said tube by said chains on said tube,
   said sensing means being adapted to drive said motor to reduce the force of said lead screw when the pressure thereof exceeds a predetermined amount and to drive said lead screw to increase the pressure thereof on said chains when the pressure exerted thereby drops below a predetermined amount.

2. A machine for forming, welding, and heavy reduction of cross section of pipe from sheets of material comprising means to support a strip of material to be formed, means for forming said strip into the shape of a tube, means to weld the edges of said strip together, sizing means to reduce the size of said tube, pull unit means to pull said tube through said forming means, said forming means comprising a plurality of wheels having a peripheral groove therein for receiving said strip and being disposed along said strip on opposite sides thereof and adapted to form said strip generally into a channel open at one side, a support extending into said channel, a rod attached to said support and extending down said channel, forming rolls disposed on opposite sides of said channel, means on said forming rolls engaging said material and forming it to close said channel to form a tube, said welding means being disposed adjacent said forming means, a plug having a portion in the shape of the frustum of a cone attached to the distal end of said rod and disposed in said tube, the base of said frustum defining said tube being smaller in diameter than said tube, a die having a cavity therein in the shape of the frustum of a cone larger in corresponding dimensions than said plug and disposed concentric to said plug around said tube, the small end of said cavity in said die being substantially the same size as the outer diameter of said tube to be formed, said pull unit means being beyond said die from said welding means, and a plurality of progressively smaller said dies spaced along said tube, and a plurality of progressively smaller said plugs inside said dies, each said plug being attached to said rod.

3. A machine for forming, welding, and heavy reduction of cross section of pipe from sheets of material comprising means to support a strip of material to be formed, means for forming said strip into the shape of a tube, means to weld the edges of said strip together, sizing means to reduce the size of said tube, and pull unit means to pull said tube through said forming means, said pull means comprising continuous chains on opposite sides of said tube, each said chain having spaced clamps thereon, each said clamp having a groove in its outer surface, the surface of said groove being in the form of a part of a cylinder and adapted to receive and frictionally engage the outside surface of said tube, said clamps comprising shoes, said groove defining a generally hemi-cylindrical surface for receiving said tube, a circumferential groove formed around the inner surface of said hemi-cylindrical surface, the walls of said circumferential groove being inclined toward each other, a strip of flexible material having the edges thereof complementary in shape to the sides of said grooves, said strip being disposed in said circumferential groove and extending inwardly and defining a hemi-cylindrical surface of lesser diameter than the diameter of said first mentioned hemi-cylindrical surface, means to regulate pressure comprising a lead screw, a motor actuating said lead screw, and a sensing means for determining the force exerted on said tube by said chains on said tube, said sensing means being adapted to drive said motor to reduce the force of said lead screw when the pressure thereof exceeds a predetermined amount and to drive said lead screw to increase the pressure thereof on said chains when the pressure exerted thereby drops below a predetermined amount.

References Cited in the file of this patent

UNITED STATES PATENTS

| | | |
|---|---|---|
| 1,904,885 | Seeley | Apr. 18, 1933 |
| 2,012,796 | Kurze | Aug. 27, 1935 |
| 2,024,485 | Sussman | Dec. 17, 1935 |
| 2,475,348 | Black | July 5, 1949 |
| 2,742,144 | Mayerback | Apr. 17, 1956 |
| 2,767,829 | Hallden | Oct. 23, 1956 |
| 2,941,491 | Knost | June 21, 1960 |

FOREIGN PATENTS

| | | |
|---|---|---|
| 936,084 | Germany | Nov. 10, 1955 |